United States Patent
Kim et al.

(10) Patent No.: US 10,137,666 B2
(45) Date of Patent: Nov. 27, 2018

(54) NOISE ABSORBENT FABRIC HAVING IMPROVED HEAT AND SOUND INSULATION PROPERTY AND METHOD FOR MANUFACTURING THE SAME

(71) Applicants: Hyundai Motor Company, Seoul (KR); Kia Motors Corporation, Seoul (KR)

(72) Inventors: Keun Young Kim, Gyeonggi-Do (KR); Kie Youn Jeong, Gyeonggi-Do (KR); Bong Hyun Park, Gyeonggi-Do (KR); Won Jin Seo, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 15/375,907

(22) Filed: Dec. 12, 2016

(65) Prior Publication Data
US 2017/0165943 A1    Jun. 15, 2017

(30) Foreign Application Priority Data

Dec. 11, 2015    (KR) ........................ 10-2015-0176864

(51) Int. Cl.

| | | |
|---|---|---|
| B29C 70/24 | (2006.01) | |
| B32B 15/14 | (2006.01) | |
| B32B 5/02 | (2006.01) | |
| B32B 5/12 | (2006.01) | |
| B32B 7/12 | (2006.01) | |
| B32B 15/20 | (2006.01) | |
| B32B 38/00 | (2006.01) | |
| G10K 11/168 | (2006.01) | |
| G10K 11/162 | (2006.01) | |
| B32B 38/08 | (2006.01) | |
| B32B 37/12 | (2006.01) | |
| B29L 31/30 | (2006.01) | |
| B32B 37/02 | (2006.01) | |

(52) U.S. Cl.
CPC .............. *B32B 15/14* (2013.01); *B29C 70/24* (2013.01); *B32B 5/022* (2013.01); *B32B 5/12* (2013.01); *B32B 7/12* (2013.01); *B32B 15/20* (2013.01); *B32B 38/08* (2013.01); *B32B 38/164* (2013.01); *G10K 11/162* (2013.01); *G10K 11/168* (2013.01); *B29K 2995/0001* (2013.01); *B29L 2031/30* (2013.01); *B32B 37/02* (2013.01); *B32B 37/12* (2013.01); *B32B 2038/0076* (2013.01); *B32B 2250/02* (2013.01); *B32B 2255/06* (2013.01); *B32B 2255/26* (2013.01); *B32B 2260/021* (2013.01); *B32B 2260/046* (2013.01); *B32B 2262/02* (2013.01); *B32B 2262/0246* (2013.01); *B32B 2262/0253* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2264/10* (2013.01); *B32B 2264/101* (2013.01); *B32B 2264/102* (2013.01); *B32B 2264/105* (2013.01); *B32B 2307/10* (2013.01); *B32B 2307/102* (2013.01); *B32B 2307/304* (2013.01); *B32B 2307/306* (2013.01); *B32B 2307/3065* (2013.01); *B32B 2307/54* (2013.01); *B32B 2307/70* (2013.01); *B32B 2307/714* (2013.01); *B32B 2307/72* (2013.01); *B32B 2307/728* (2013.01); *B32B 2307/732* (2013.01); *B32B 2307/734* (2013.01); *B32B 2605/00* (2013.01)

(58) Field of Classification Search
USPC ........................................ 428/457; 427/389.9
See application file for complete search history.

(56) References Cited

U.S. PATENT DOCUMENTS

| 2,483,754 A | * | 10/1949 | Clifton | ........................ C08J 5/12 |
| | | | | 428/623 |
| 2012/0247868 A1 | * | 10/2012 | Kato | ..................... H05K 9/0084 |
| | | | | 181/284 |

FOREIGN PATENT DOCUMENTS

| JP | 1994-081407 | 3/1994 |
| JP | 3302497 | 7/2002 |
| JP | 2005-019783 A | 1/2005 |
| KR | 10-1372073 | 12/2013 |
| KR | 10-1428426 | 8/2014 |

* cited by examiner

*Primary Examiner* — Terressa Boykin
(74) *Attorney, Agent, or Firm* — Mintz Levin Cohn Ferris Glovsky and Popeo, P.C.; Peter F. Corless

(57) ABSTRACT

Disclosed is a noise-absorbent fabric having a superior heat-insulation property and sound-insulating property and a method for manufacturing the same. The noise-absorbent fabric includes a noise-absorbing layer comprising a nonwoven fabric formed of a heat-resistant fiber and impregnated with a binder; and a metal film stacked thereon. As such, the noise-absorbent fabric having superior sound-absorbing property, heat-insulating property and sound-insulating property can be obtained and be applicable to parts maintained at high temperatures of 300° C. or greater. In addition, the noise-absorbent fabric can be moldable using the binder in a desired three-dimensional shape.

24 Claims, 6 Drawing Sheets

NOISE ABSORBENT FABRIC HAVING IMPROVED HEAT AND SOUND INSULATION PROPERTY AND METHOD FOR MANUFACTURING THE SAME

CROSS-REFERENCE TO RELATED APPLICATIONS

This application claims, under 35 U.S.C. § 119, the priority of Korean Patent Application No. 10-2015-0176864, filed on Dec. 11, 2015, in the Korean Intellectual Property Office, the disclosure of which is incorporated herein by reference in its entirety.

BACKGROUND (a) Technical Field

The present invention relates to a noise-absorbent fabric having a good heat- and sound-insulating property and a method for manufacturing the same. The noise-absorbent fabric may include a noise-absorbing layer that may include a nonwoven fabric formed of a heat-resistant fiber is impregnated with a binder and a metal film stacked on the noise-absorbing layer. The noise-absorbing layer may include a nonwoven fabric comprising a heat-resistant fiber and impregnated with a binder. As such, the noise-absorbent fabric may obtain superior sound-absorbing property, heat-insulating property and sound-insulating property, and can be applicable to parts maintained at high temperatures of about 300° C. or greater. In addition, the noise-absorbent fabric of the present invention may be moldable using the binder.

(b) Background Art

Noise, as an unwanted side effect of industrial development, causes gradually more damages. Various method have been taken to prevent noise. For example, as a way of such noise prevention, research into developing new sound-absorbing and -insulating materials capable of absorbing or insulating sound has been conducted in various ways.

Representative industrial sectors requiring sound-absorbing and -insulating materials include electric appliances such as an air conditioner, a refrigerator, a washing machine, a lawn mower, and the like, transportation such as an automobile, a ship, an airplane, and the like, and construction materials such as a wall material, a flooring material, and the like. The sound-absorbing and -insulating material also have been required in other various industrial fields. In general, the sound-absorbing and sound-insulating materials used in industries require, in addition to a good sound-absorbing property, lightweight, flame retardancy, heat resistance and a heat-insulating property, depending on particular applications. In particular, flame retardancy and heat resistance may be required for sound-absorbing and -insulating materials used in engines, exhaust systems, and the like maintained at high temperatures, for example, of about 300° C. or greater. In related arts, an aramid fiber has been drawing attentions for sound-absorbing and -insulating materials having superior heat resistance.

SUMMARY

In preferred aspects, the present invention provides a new noise-absorbent fabric having superior sound-absorbing property, heat-insulating property and sound-insulating property and being moldable. The new noise-absorbent fabric may include a binder impregnated into a nonwoven fabric having irregular microcavities with a complicated three-dimensional labyrinth structure and cured to maintain the the-dimensional structure inside the nonwoven fabric without blocking the microcavities, thereby improving the physical properties of the nonwoven fabric such as sound-absorbing property, allowing molding into a desired shape during the curing of the binder and improving sound-absorbing property, heat-insulating property and sound-insulating property. In addition, the new noise-absorbent fabric may include a metal film (skin layer) stacked on the binder-impregnated noise-absorbing layer.

In one aspect, provided is a noise-absorbent fabric having superior sound-absorbing property, heat-insulating property and sound-insulating property and being moldable into a desired shape. The noise noise-absorbent fabric may include a binder that is impregnated into a nonwoven fabric comprising a heat-resistant fiber and cured.

In another aspect, provided is a method for manufacturing a noise-absorbent fabric. The method may comprise a step of forming a noise-absorbing layer by impregnating a binder into a nonwoven fabric comprising a heat-resistant fiber; and drying the nonwoven fabric; and a step of forming a skin layer by stacking a metal film on the noise-absorbing layer.

Further, in another aspect, provided is a method for reducing noise by applying the noise-absorbent fabric to a noise-generating device.

In one preferred aspect, the present invention provides a noise-absorbent fabric that may comprise: a metal film; and a noise-absorbing layer. The noise-absorbing layer may include i) a nonwoven fabric comprising an amount of about 30-100 wt % of a heat-resistant fiber based on the total weight of the nonwoven fabric and ii) a first binder. The nonwoven fabric may comprise microcavities.

Preferably, the first binder may be present in the same layer as the nonwoven fabric and maintain a three-dimensional structure inside or in combination with the nonwoven fabric. Preferably, the first binder may maintain and/or form microcavities in the nonwoven fabric as being distributed and attached on the yarn surface of the nonwoven fabric.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder of the present invention may contain polyamic acid that can be polymerized into polyimide upon heating. Preferably, the binder according to the present invention generally refers to a polyimide binder.

By stating the first binder may maintain a three-dimensional structure (shape) inside, within, or in combination with the nonwoven fabric, it is meant, for instance, that the first binder may be partially or entirely cured or polymerized by heating, UV radiation, electron beaming, chemical polymerization and the like as being attached or impregnated in the nonwoven fiber, such that the three-dimensional structure can be fixed, immobilized or maintained.

The term "microcavity (microcavities)", as used herein, may be a feature formed inside a nonwoven fabric layer and formed by fibers which may be regularly or irregularly arranged inside the nonwoven fabric layer. Further, the microcavities may be formed by any kinds of material inside the nonwoven fabric, whether inherently existed or subsequently added. The microcavities also may be formed by a binder, a resin additive, or the like, without limitation. The microcavities may include any kinds of internal space or vacancy. The microcavities may be open to outside of the nonwoven fabric or be connected therebetween inside the nonwoven fabric layer. The microcavities may be various structural shapes, for example, a pore, a hole, a labyrinth, a channel, or the like, but the examples are not limited thereto. The microcavities formed in the nonwoven fabric may be randomly distributed, i.e. not in a particular pattern, or distance between the adjacent, adjunct or nearest neighboring microcavities may vary, for example, from about 5% to about 200%, or from about 5% to about 100%, of the average distance between the microcavities. Size dimension of the microcavities may vary from several nanometer scale to hundreds micrometer scale, without limitation. In particular, the microcavities may provide a resonance path of sound or noise, and further provide a sound absorbing property. The resonance path of a sound in the microcavities may not be limited to a specific frequency of sound.

The term "three-dimensional structure inside the nonwoven fabric" refers to a structural feature defined in a three-dimension (i.e. defined with x-, y- and z-coordination), and the structures may be formed by regularly arranged or irregularly tangled fibers of the nonwoven fabric. The three-dimensional structure may include space such as microcavities and random distribution of the fibers or strings, and the volume or cavity of the spaces or the entire three-dimensional structure may vary, change or maintain in various condition.

The noise-absorbent fabric may further comprise an adhesion layer, which may be positioned between the metal film and the noise-absorbing layer and bonds the metal film to the noise-absorbing layer. The adhesion layer may comprise a second binder. The second binder as used in the adhesion layer may have the same components as the first binder.

Preferably, the adhesion layer may comprise the second binder in the noise-absorbing layer and a silica aerogel. In addition, the adhesion layer suitably may comprise the second binder and the silica aerogel at a weight ratio of about 1:0.1-2 based on solid content.

Preferably, a surface of the silica aerogel may be modified with a polyethylene glycol fatty acid ester. For instance, the polyethylene glycol fatty acid ester may be attached, coated or formed in a film on the surface of the silica aerogel.

Preferably, the metal film may be an aluminum thin film having a thickness of about 0.01-0.5 mm.

Preferably, the heat-resistant fiber may have a limiting oxygen index (LOI) of 25% or greater and a heat resistance temperature of about 300° C. or greater.

The term "limiting oxygen index (LOI)", as used herein, indicates the minimum concentration of oxygen, expressed as a percentage, that will support combustion of a polymer or material. The LOI may be typically measured by passing a mixture of oxygen and nitrogen over a burning specimen of the polymer or material, and reducing the oxygen level until a critical level is reached. The LOI values for different polymers or materials may be readily determined by such a procedure including standardized tests, such as the ISO 4589 and ASTM D2863.

The heat-resistant fiber suitably may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBT) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber. Preferably, the heat-resistant fiber may be an aramid fiber.

The nonwoven fabric is formed in a single-layer comprising an aramid fiber having a fineness of about 1-15 denier and having a thickness of about 3-20 mm. In addition, the nonwoven fabric may have a density of about 100-2000 g/m².

The first binder or the second binder may be a thermosetting resin. Preferably, the first binder or the second binder may be an epoxy resin. The epoxy resin suitably may be one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin, and an o-cresol novolac epoxy resin.

The noise-absorbent fabric may be formed into a three-dimensional shape corresponding to an object to which the noise-absorbent fabric may be applied.

The noise-absorbing layer may comprise a single layer or multiple layers.

The noise-absorbent fabric as described herein suitably may be used for a vehicle.

In one preferred aspect, the present invention provides a method for manufacturing a noise-absorbent fabric that may comprise steps of: a) immersing a nonwoven fabric comprising an amount of about 30-100 wt % of a heat-resistant fiber based on the total weight of the nonwoven fabric in a binder solution comprising a first binder; b) forming a noise-absorbing layer by drying the nonwoven fabric; and c) manufacturing a noise-absorbent fabric by stacking a metal film on the noise-absorbing layer.

The method may further comprise coating an adhesive layer comprising a second binder on a side of the metal film facing to the noise-absorbing layer. Preferably, the second binder as used in the adhesion component may have the same components as the first binder. The adhesion layer may comprise the second binder used in the noise-absorbing layer and a silica aerogel. The adhesion layer may comprise the second binder and the silica aerogel at a weight ratio of about 1:0.1-2 based on solid content. Preferably, a surface of the silica aerogel may be modified using a polyethylene glycol fatty acid ester. Preferably, the adhesion layer may have a thickness of about 0.05-0.5 mm.

The method may further comprise, after manufacturing the noise-absorbent fabric, molding the noise-absorbent fabric into a desired shape.

Preferably, the metal film may be an aluminum thin film having a thickness of about 0.01-0.5 mm.

The heat-resistant fiber in the non-woven fiber may have a limiting oxygen index (LOI) of 25% or greater and a heat resistance temperature of about 300° C. or greater.

The heat-resistant fiber may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber. Preferably, the heat-resistant fiber may be an aramid fiber having a fineness of about 1-15 denier and a yarn length of about 20-100 mm.

The nonwoven fabric suitably may have a thickness of about 3-20 mm and a density of about 100-2000 g/m².

The method may further comprise prior to immersing the nonwoven fabric in the binder solution, forming the nonwoven fabric having a thickness of about 3-20 mm by a needle punching process of a heat-resistant aramid fiber having a fineness of about 1-15 denier. Preferably, the nonwoven fabric may be formed by continuously performing up-down needling, down-up needling and up-down needling. Preferably, the nonwoven fabric may be formed with a needle stroke of about 30-350 times/m$^2$.

The binder solution may comprise an amount of about 1-60 wt % of a first binder, an amount of about 0.1-10 wt % of a curing agent, an amount of about 0.01-5 wt % of a catalyst, an amount of about 1-40 wt % of an additive and a remaining balance of a solvent, all the wt % based on the total weight of the binder solution. Alternatively, the binder solution may comprise an amount of about 1-30 wt % of a first binder, an amount of about 0.1-10 wt % of a curing agent, an amount of about 0.01-5 wt % of a catalyst, an amount of about 1-30 wt % of a flame retardant and an amount of about 40-95 wt % of a solvent, all the wt % based on the total weight of the binder solution.

The first binder may be a thermosetting resin. Preferably, these binders may be an epoxy resin. Preferably, the epoxy resin may be one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin, and an o-cresol novolac epoxy resin.

The nonwoven fabric may be dried at a temperature of about 70-200° C. and the dried nonwoven fabric comprises an amount of about 1-300 parts by weight of the first binder based on 100 parts by weight of the nonwoven fabric.

Preferably, the noise-absorbent fabric may be used for a vehicle.

In another preferred aspect, the present invention provides a method for reducing noise of a noise-generating device. The method may comprise: i) manufacturing and molding the noise-absorbent fabric as described herein so as to partially or entirely correspond to the three-dimensional shape of the device; and ii) applying the noise-absorbent fabric adjacent to the noise-generating device. In certain aspects, the method suitably may further comprise checking a three-dimensional shape of the noise-generating device preferably before the manufacturing and molding.

The noise-absorbent fabric of the present invention may include the first binder as being impregnated into the nonwoven fabric comprising a heat-resistant fiber, such that the noise-absorbent fabric may obtain improved sound-absorbing property, heat-insulating property and sound-insulating property due to the layer of a metal film stacked on the noise-absorbing layer and it can be shaped into a three-dimensional shape due to the first binder impregnated into the noise-absorbing layer after curing.

Moreover, when manufacturing the noise-absorbent fabric of the present invention, a hot pressing process for integrating the nonwoven fabric with the skin material may not be necessary unlike the process for the conventional noise-absorbent fabric having a stacked structure, because the noise-absorbing layer may be adhered to the skin layer (i.e. metal film) by the first binder impregnated into the nonwoven fabric.

Further, the noise-absorbent fabric of the present invention may have improved properties by further including various functional additives in the binder solution.

The noise-absorbent fabric of the present invention may have substantially improved flame retardancy, heat resistance and a heat-insulating property in addition to a sound-absorbing property, as such, the noise-absorbent fabric may not be deformed or denatured even when used in a noise-generating device maintained at high temperatures of about 300° C. or above.

Particularly, when a thermosetting resin is used as the binder, i.e. first binder and second binder, the noise-absorbent fabric may be molded into a desired shape during the curing of the thermosetting resin. In addition, in a high-temperature molding process for manufacturing the noise-absorbent fabric, because the curing of the thermosetting resin and molding occur at the same time, the related process may be simplified.

Since the nonwoven fabric formed of a heat-resistant fiber is used, thermal deformation of the nonwoven fabric due to the reaction heat of thermal curing may not occur even when the thermosetting resin is used as the first binder.

Accordingly, the noise-absorbent fabric of the present invention may be useful as a noise-absorbent fabric in various applications requiring absorption or insulation of noise, including electric appliances such as an air conditioner, a refrigerator, a washing machine, a lawn mower, and the like, transportation such as an automobile, a ship, an airplane, and the like, and construction materials such as a wall material, a flooring material, and the like. Thus, the noise-absorbent fabric of the present invention may be applied to a noise-generating device that operates and maintains at high temperatures, for example, 300° C. or above. In particular, when the noise-absorbent fabric of the present invention is used in a vehicle, it may be closely attached to a noise-generating device of the vehicle such as an engine, an exhaust system, and the like, provided with a predetermined distance from the noise-generating device, or molded as a part of the noise-generating device.

Other aspects of the invention are disclosed infra.

BRIEF DESCRIPTION OF DRAWINGS

FIG. 1A shows a cross-sectional structure of an exemplary noise-absorbing layer 2 in which a first binder is uniformly impregnated in a nonwoven fabric, FIG. 1B shows a cross-sectional structure in which an exemplary first binder is coated on one side of a metal film 1, and FIG. 1C shows a cross-sectional structure of an exemplary noise-absorbent fabric obtained by joining the noise-absorbing layer 2 and the metal film 1.

FIG. 2A is an image of an exemplary nonwoven fabric before impregnation of an exemplary first binder, FIG. 2B is an image of an exemplary nonwoven fabric in which 20 parts by weight of an exemplary first binder has been impregnated based on 100 parts by weight of the nonwoven fabric, and FIG. 2C is an image of an exemplary nonwoven fabric in which 50 parts by weight of an exemplary first binder has been impregnated based on 100 parts by weight of the nonwoven fabric.

FIG. 3A is an image of an exemplary noise-absorbent fabric molded for use in an exemplary vehicle engine, and FIG. 3B shows an exemplary noise-absorbent fabric being applied to an exemplary part of a vehicle engine.

FIG. 4A is an image of an exemplary noise-absorbent fabric molded for use in a lower part of a vehicle, and FIG. 4B shows an exemplary noise-absorbent fabric being attached to an exemplary lower part of a vehicle.

DETAILED DESCRIPTION

Figure 1A:
FIGS. 1A-1C show the cross-sectional structure of a noise-absorbent fabric of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a noise-absorbent fabric and a method for manufacturing same. The noise-absorbent fabric of the present invention may have superior sound-absorbing property, heat-insulating property and sound-insulating property due to a metal film stacked on a noise-absorbing layer. In addition, the noise-absorbent fabric may be moldable into a desired three-dimensional shape using the first binder, which may be present in the same layer as a nonwoven fabric in the noise-absorbing layer.

In one aspect, the present invention provides a noise-absorbent fabric including: a metal film; and a noise-absorbing layer. The noise-absorbing layer may include a nonwoven fabric comprising an amount of about 30-100 wt % of a heat-resistant fiber based on the total weight of the non-woven fabric, and the first binder. The first binder may be present in the same layer as the nonwoven fabric and maintain the the-dimensional shape inside the nonwoven fabric. In particular, the first binder may maintain and/or further form microcavities in the nonwoven fabric as being distributed and attached on the yarn surface of the nonwoven fabric.

The noise-absorbent fabric may further include an adhesion layer 3 between the metal film 1 and the noise-absorbing layer 2. The adhesion layer 3 may include a second binder, i.e. a highly heat-resistant binder as an adhesive component, which may be same as the first binder used to form the noise-absorbing layer 2. As such, adhesion between the metal film 1 and the noise-absorbing layer 2 may be improved and further the sound-absorbing property, heat-insulating property and sound-insulating property of the noise-absorbent fabric may be improved.

Preferably, the adhesion layer 3 may include a second binder, which may have the same components or binding components as the first binder used to form the noise-absorbing layer 2 and a silica aerogel. When a silica aerogel is contained in the adhesion layer 3, the sound-absorbing property, heat-insulating property and sound-insulating property may be substantially improved. The adhesion layer 3 may comprise the second binder and the silica aerogel at a weight ratio of about 1:0.1-2 based on solid content.

Preferably, the adhesion layer 3 may include the silica aerogel, which may be modified on the surface thereof, using by a polyethylene glycol fatty acid ester to provide hydrophilicity. For instance, the polyethylene glycol fatty acid ester may be chemically or physically attached, bonded or coated on the silica aerogel. The silica aerogel with increased hydrophilicity with a polyethylene glycol fatty acid ester may have a hydrophilic surface and, therefore, compatibility with the second binder contained as an adhesive component may be substantially improved. Preferably, the polyethylene glycol fatty acid ester may be formed from esterification of polyethylene glycol with a $C_{5-30}$ fatty acid and having a weight-average molecular weight of about 100,000-5,000,000 may be used.

Preferably, the metal film 1 may be an aluminum thin film. The metal film may be an aluminum thin film having a thickness of about 0.01-0.5 mm.

In an exemplary embodiment of the present invention, the heat-resistant fiber included in the noise-absorbing layer 2 may have a limiting oxygen index (LOI) of 25% or greater and a heat resistance temperature of about 300° C. or greater. In For instance, heat-resistant fiber may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

Preferably, the heat-resistant fiber may be an aramid fiber. The nonwoven fabric may include an aramid fiber having a fineness of about 1-15 denier and a single layer of the nonwoven fabric has a thickness of about 3-20 mm.

Preferably, the nonwoven fabric suitably may have a density of about 100-2000 g/m². In addition, the nonwoven fabric may have a density of about 200-1200 g/m².

The first binder included in the noise-absorbing layer 2 and the adhesion layer 3 may be a thermosetting resin. The first and second binders in the noise-absorbing layer 2 and the adhesion layer 3 may be same or different, preferably, have same or similar bonding affinity, or chemical properties to enhance bonding forces between the noise-absorbing layer 2 and the adhesion layer. The thermosetting resin may be an epoxy resin, which may form and/or maintain a three-dimensional network structure inside the nonwoven fabric. For instance, the epoxy resin may be one or more selected from the group consisting of: bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

Figure 1B:
Figure 1C:
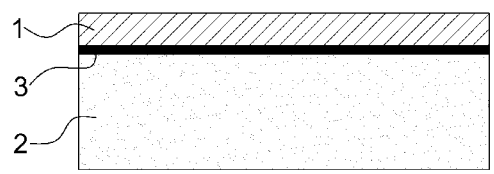

The structure of an exemplary noise-absorbent fabric according to an exemplary embodiment of the present invention is described in more detail referring to FIGS. 1A-1C.

FIGS. 1A-1C show the noise-absorbent fabric of the present invention wherein an adhesion layer 3 is positioned between a metal film 1 and a noise-absorbing layer 2 in which a first binder is uniformly distributed inside a nonwoven fabric formed of a heat-resistant fiber. FIG. 1A shows the cross-sectional structure of an exemplary noise-absorbing layer 2 in which an exemplary first binder is uniformly distributed in a nonwoven fabric formed of a heat-resistant fiber, FIG. 1B shows the cross-sectional structure in which an exemplary adhesion layer 3 formed as an adhesive component is coated on one side of the metal film, and FIG. 1C shows the cross-sectional structure of an exemplary noise-absorbent fabric wherein the noise-absorbing layer 2 is attached to the metal film 1 with the adhesion layer 3 formed or disposed therebetween.

Figure 2A:
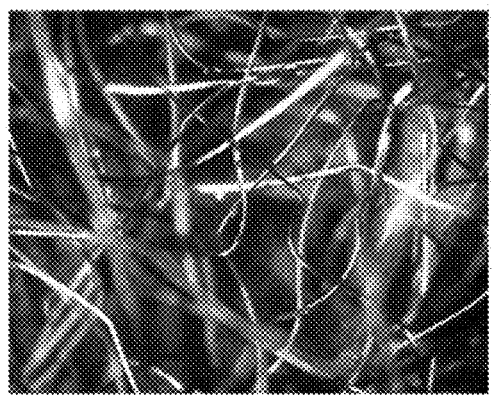
FIGS. 2A-2C show electron microscopic images (×300) of a nonwoven fabric before and after impregnation of the first binder.
Figure 2B:
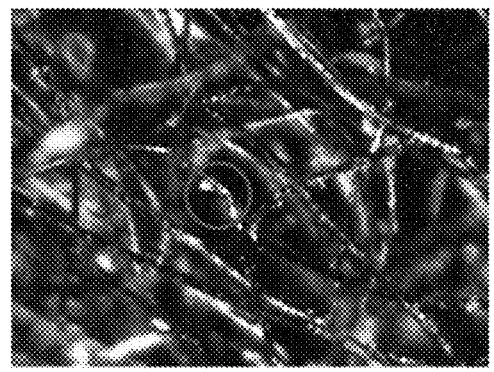
Figure 2C:
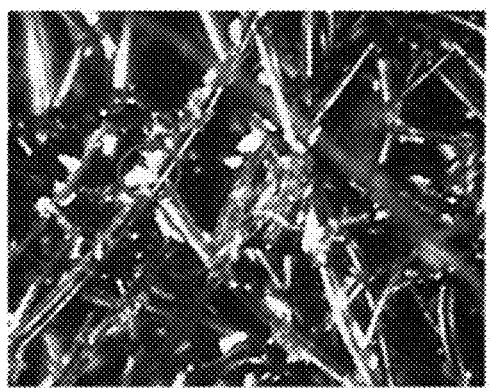

FIGS. 2A-2C show electron microscopic images showing the three-dimensional structure inside the nonwoven fabric before and after impregnation of the first binder.

FIG. 2A is an electron microscopic image showing an internal structure of an exemplary nonwoven fabric before impregnation of the first binder. It can be seen that heat-resistant fiber yarns cross each other to form irregular microcavities. FIGS. 2B and 2C are electron microscopic images after impregnation of the first binder into the nonwoven fabric. It can be seen that the first binder is finely distributed and attached to the heat-resistant fiber yarns. Also, it can be seen that the content of the first binder on the yarn surface increases as the content of the first binder increases.

Although there may be differences depending on the preparation method, fibers may be randomly arranged three-dimensionally in the nonwoven fabric. Accordingly, the pore structure inside a nonwoven fabric tends to be a very complicated labyrinth structure wherein regularly or irregularly arranged fibers may be three-dimensionally interconnected, instead of being arranged in bundles of independent capillary tubes. Preferably, the nonwoven fabric used in the present invention may have irregular microcavities formed as the yarns formed of the heat-resistant fiber loosely cross each other.

When the first binder is impregnated into the nonwoven fabric, the first binder may be finely and uniformly distributed and attached to the yarn surface of the nonwoven fabric comprising the heat-resistant fiber, thereby forming much finer microcavities than before the impregnation. The "finer" or "fine" microcavities may include microcavities having decreased size than typical microcavities formed in non-treated nonwoven fabric. The formation of fine microcavities in the internal structure of the nonwoven fabric may provide increased resonance of noise and improvement of sound-absorbing property in accordance with the increase. When a three-dimensional network structure is formed as the first binder is cured, the sound-absorbing property can be substantially improved since greater numbers of the fine microcavities may be formed inside the nonwoven fabric.

Accordingly, since the nonwoven fabric can maintain the intrinsic three-dimensional inner structure as the first binder is uniformly impregnated into the nonwoven fabric and, additionally, since greater numbers of fine microcavities are formed as the first binder is cured, the noise-absorbent fabric of the present invention may obtain substantially improved sound-absorbing performance due to substantially increased or maximized noise absorption through increased resonance in the nonwoven fabric.

As seen from the electron microscopic images of FIGS. 2A-2C, in the noise-absorbent fabric of the present invention, the first binder may be uniformly dispersed and distributed on the surface of the heat-resistant fiber yarns constituting the nonwoven fabric.

Hereinafter, the noise-absorbent fabric according to the present invention having the internal structure described above is described in more detail.

The noise-absorbent fabric according to the present invention has a structure in which a skin layer, i.e. a metal film and a noise-absorbing layer, and the skin layer may be stacked on the noise-absorbing layer. Particularly, the noise-absorbing layer may comprise a nonwoven fabric comprising a heat-resistant fiber and a first binder impregnated in the non-woven fabric. The noise-absorbing layer of the noise-absorbent fabric according to the present invention may comprise a single layer or multiple layers.

The noise-absorbent fabric of the present invention may include a metal film as a skin layer.

The metal film may improve the heat-insulating property of insulating heat above 300° C., the sound-insulating property of insulating noise and the sound-absorbing of absorbing noise. The metal film used in the present invention may be made of any metal material, for example, the metal material may have a heat resistance temperature of about 300° C. or greater and may not be damaged on the surface after molding process, e.g. compression molding, with the nonwoven fabric or nonwoven fabric felt. Preferably, the metal film may be an aluminum material, which may provide a desirable effect in terms of weight reduction when an aluminum material is used as the skin layer of the noise-absorbent fabric. Preferably, the metal film used as the skin layer may have a thickness of about 0.01-0.5 mm. When the thickness is less than about 0.01 mm, heat-insulating property may not be sufficiently obtained. When the thickness is greater than about 0.5 mm, weight may increase and appearance may be unsatisfactory after the molding.

In the present invention, the metal film stacked as the skin layer may further improve the sound-absorbing property and sound-insulating property of the noise-absorbing layer.

When the metal film is stacked on the noise-absorbing layer by physical joining or attachment, the two layers may be easily separated. Preferably, an adhesive layer containing an adhesive second binder may be used and interposed between the noise-absorbing layer and the metal film. However, when a conventional adhesive binder is used, peeling may occur easily between the two layers under high-temperature conditions of 300° C. or greater. In the present invention, the same heat-resistant second binder as that used in the noise-absorbing layer may be positioned as an adhesion layer between the noise-absorbing layer and the metal film so as to prevent peeling between the two layers under high-temperature conditions of about 300° C. or greater.

The noise-absorbent fabric of the present invention may include a noise-absorbing layer comprising a nonwoven fabric impregnated with a first binder. Preferably, a heat-resistant fiber may be used as the main fiber component constituting the nonwoven fabric.

The heat-resistant fiber may be have superior durability and capable of enduring high-temperature and ultrahigh-temperature conditions. Preferably, the heat-resistant fiber may have a limiting oxygen index (LOI) of about 25% or greater and a heat resistance temperature of about 300° C. or greater. Particularly, the heat-resistant fiber may be one having a limiting oxygen index (LOI) of about 25-80% and a heat resistance temperature of about 300-3000° C. Further, in particular, the heat-resistant fiber may be one having a limiting oxygen index (LOI) of about 25-70% and a heat resistance temperature of about 300-1000° C. In addition, the heat-resistant fiber may have a fineness of about 1-15 denier, or particularly of about 1-6 denier and a yarn length of about 20-100 mm, or particularly of about 40-80 mm.

A so-called super fiber, which is the name commonly used in the related art, may be used as the heat-resistant fiber. Particularly, the super fiber may be one or more selected from an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber, a ceramic fiber, and the like, but the examples of the super fiber is not limited thereto.

Among those, an aramid fiber suitably may be used as the heat-resistant fiber in the present invention. For instance, meta-aramid, para-aramid or a mixture thereof may be used as the heat-resistant fiber without limitation in contents or mixing ratios thereof. The aramid fiber used as the yarn of the nonwoven fabric in the present invention may have a fineness of about 1-15 denier, or particularly of about 1-6 denier, and a yarn length of about 20-100 mm, or particularly of about 40-80 mm. When the yarn length is less than the predetermined length, for example, less than about 20 mm, bridging of yarns may be difficult during needle punching. As a result, cohesion of the nonwoven fabric may be weak. When the yarn length is greater than the predetermined length, for example, greater than about 100 mm, cohesion of the nonwoven fabric may be superior but movement of yarns may be difficult during carding.

The aramid fiber is an aromatic polyamide fiber wherein aromatic rings such as benzene ring are bonded with each other by amide groups. In distinction from an aliphatic polyamide (e.g., nylon), the aromatic polyamide fiber is called 'aramid'. The aramid fiber can be prepared by spinning of aromatic polyamide and is classified into meta-aramid (m-aramid) and para-aramid (p-aramid) depending on the location of the amide bonds.

[Chemical Formula 1]

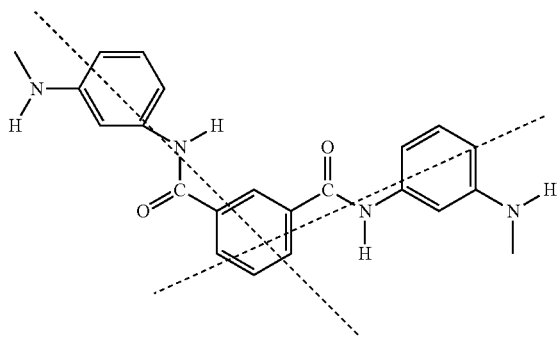

[Chemical Formula 2]

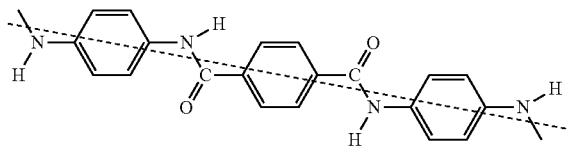

The meta-aramid (m-aramid) represented by Chemical Formula 1 may be prepared by dry spinning after dissolving isophthaloyl chloride and m-phenylenediamine in a dimethylacetamide (DMAc) solvent. The meta-aramid may have a relatively high elongation at break of about 22-40% due to the uneven polymer structure, suitably may be dyed and be easily prepared into fiber. It is appreciated that Nomex™ (DuPont, USA), Conex™ (Teijin, Japan) and the like may provide a range of options for the m-aramid, but the examples are not limited thereto.

The para-aramid (p-aramid) represented by Chemical Formula 2 may be prepared by wet spinning after dissolving terephthaloyl chloride and p-phenylenediamine in an N-methylpyrrolidone (NMP) solvent. The para-aramid may have high strength due to its highly oriented linear molecular structure. Being stronger than meta-aramid about 3-7 times, the para-aramid is used for reinforcement or protection materials. Also, the para-aramid may have strong chemical resistance, less thermal shrinkage and superior dimensional stability as well as high tensile strength, flame resistance and self-extinguishing property. It is appreciated that Kevlar™ (DuPont, USA), Twaron™ (Teijin, Japan) and Technora™ (Teijin, Japan) may provide a range of options for the p-aramid, but the examples are not limited thereto.

The aramid may be provided in the form of filament, staple, yarn, and the like and be used for reinforcing materials (transformer, motor, and the like), insulating materials (insulating paper, insulating tape, and the like), heat-resistant fibers (fireproof clothing, gloves, and the like), high-temperature filters, or the like.

Although the heat-resistant fiber is used as the main component in the nonwoven fabric constituting the noise-absorbent fabric of the present invention, nonwoven fabrics may be prepared by further adding other fibers to the heat-resistant fiber yarn, to reduce cost or provide lightweight, functionality, and the like to the nonwoven fabric, which can be also be included in the scope of the present invention. In other words, although the nonwoven fabric of the present invention may be prepared from the heat-resistant fiber yarn, the present invention is not limited to the nonwoven fabric consisting only of the heat-resistant fiber. Preferably, the nonwoven fabric of the present invention may include the heat-resistant fiber yarn in an amount of about 30-100 wt %, or particularly of about 60-100 wt %, based on the weight of the nonwoven fabric.

Further, the noise-absorbing layer may include the heat-resistant fiber nonwoven fabric where the first binder may be impregnated therein. In particular, the first binder may be present in the same layer as the nonwoven fabric and maintains the three-dimensional structure inside the nonwoven fabric. The first binder used in the present invention may be any one capable of forming and/or maintaining the three-dimensional internal structure formed inside of the nonwoven fabric. The expression 'maintaining the three-dimensional internal structure of the nonwoven fabric' means that the binder (first binder), which is impregnated into the nonwoven fabric, may be uniformly distributed and attached to the surface of the fiber yarn of the nonwoven fabric and maintain or further form irregular the microcavities as described herein, thereby maintaining the original three-dimensional shape or structure inside the nonwoven fabric.

Although a typical binder refers to a material used for adhesion or bond of two materials, the term binder used in the present invention refers to a material impregnated into the nonwoven fabric formed of the heat-resistant fiber.

Any conventional materials may be used as the first binder impregnated into the nonwoven fabric. For instance, a thermoplastic resin or a thermosetting resin may be considered as the binder material.

The thermoplastic resin such as a polyamide-based resin may have crystalline polar groups like the aramid fiber as a representative heat-resistant fiber. When a thermoplastic binder is impregnated into the nonwoven fabric formed of the thermoplastic heat-resistant fiber, a strong interfacial layer may be formed between them by face-to-face contact between the similar crystalline polar groups, thereby partially blocking the microcavities of the nonwoven fabric. As consequence, when the thermoplastic resin is used as the binder impregnated into the nonwoven fabric formed of the thermoplastic heat-resistant fiber, sound-absorbing performance may be substantially decreased due to the partial blocking of the microcavities of the nonwoven fabric. Meanwhile, it may be thought that the sound-absorbing performance would be improved when the microcavities are blocked. However, since noise is not extinguished inside the nonwoven fabric but is transmitted via other routes, improvement of sound-absorbing performance may not be obtained when the thermoplastic binder is impregnated. In addition, when the thermoplastic binder is impregnated into a nonwoven fabric formed of the inorganic-based heat-resistant fiber, an adhesive additive may further be added because of weak adhesive or binding property between them.

In contrast, a thermosetting binder, as used herein, may have substantially different physical and chemical properties from the thermoplastic heat-resistant fiber. When a thermosetting binder is impregnated into the nonwoven fabric formed of the thermoplastic heat-resistant fiber, an interfacial layer may be formed by edge-to-edge contact because of the difference in characteristics. As a result, the microcavities in the nonwoven fabric may remain open. As such, when a thermosetting resin is used as the first binder impregnated into the nonwoven fabric formed of the heat-resistant fiber, the three-dimensional structure inside the nonwoven fabric can be maintained. Accordingly, a thermosetting resin may be used preferably as the first binder in the present invention.

In addition, the thermosetting resin may be curable with light, heat or a curing agent and its shape may not be deformed even at high temperatures. Advantageously, in accordance with the present invention, by using the heat-resistant fiber and the thermosetting binder under a specific condition, the shape of the noise-absorbent fabric can be maintained after molding such as at high temperatures. As consequence, when the thermosetting resin is used as the first binder impregnated into the nonwoven fabric, a desired shape of the non-woven fabric may be formed by molding and during the curing of the resin, and the resulting shape can be maintained even at high temperatures.

As described above, when a thermosetting resin is used as the first or second binder impregnated into the nonwoven fabric formed of the heat-resistant fiber, the effects of maintaining the three-dimensional structure inside the nonwoven fabric and molding into a desired shape during the curing of the first binder resin may be obtained.

Preferably, an epoxy resin may be used as the first or second binder. The epoxy resin is a kind of a thermosetting resin and is curable into a polymer material having a three-dimensional network structure. Accordingly, as the epoxy resin forms a network structure and microcavities when cured inside the nonwoven fabric, finer microcavities may be formed inside the nonwoven fabric and the sound-absorbing performance can be further improved.

Further, when the curing is carried out in the presence of a curing agent, more advanced or complicated three-dimensional network structure may be formed such that the sound-absorbing effect may be substantially improved. In detail, a three-dimensional network-structured polymer may be formed as the epoxy groups or hydroxy groups of the epoxy resin react with the functional groups of the curing agent such as amine groups or carboxylic acid groups to form covalent crosslinkages. The curing agent may not only serve as a catalyst that catalyzes the curing reaction, but also may be directly involved in the reaction and be linked in the molecule of the epoxy resin. Accordingly, the size and physical properties of the microcavities may be suitably controlled by selecting different curing agents.

The epoxy resin may be one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin, an o-cresol novolac epoxy resin, etc. The epoxy resin may be one having an epoxy equivalent of about 70-400. When the epoxy equivalent is the predetermined value, for example, less than about 70, intermolecular binding may be substantially reduced to form a three-dimensional network structure or the physical properties of the noise-absorbent fabric may not sufficient because of weak adhesion with the heat-resistant fiber. When the epoxy equivalent is greater than the predetermined value, for example, greater than about 400, the physical properties of the noise-absorbent fabric may not be sufficient because excessively dense network structure is formed.

When the thermosetting resin is used as the binder in the present invention, the curing agent may be included in a binder solution. The curing agent may be one having functional groups that may react readily with the functional groups of the these binders such as epoxy groups or hydroxy groups. Exemplary curing agent may include an aliphatic amine, an aromatic amine, an acid anhydride, urea, an amide, imidazole, etc. may be used. Preferably, the curing agent may be one or more selected from the group consisting of diethyltoluenediamine (DETDA), diaminodiphenylsulfone (DDS), boron trifluoride-monoethylamine ($BF_3$·MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole, and the like. Among those, an aliphatic amine- or amide-based curing agent suitably may be used due to sufficient crosslinking ability and very superior chemical resistance and weather resistance. Preferably, dicyandiamide (Dicy) may be used in consideration of crosslinking ability, flame retardancy, heat resistance, storage stability, processability, and the like. Because dicyandiamide (Dicy) has a high melting point above 200° C., it may provide superior storage stability after being mixed with the epoxy resin and may ensure sufficient processing time for curing and molding.

As used herein, a catalyst may facilitate the curing of the thermosetting resin used as the first binder. Exemplary catalyst may be one or more selected from the group consisting of urea, dimethylurea, a tetraphenylborate salt of quaternary DBU, and quaternary phosphonium bromide, but examples of the catalyst are not limited thereto. The catalyst may be included in the binder-containing solution.

In addition, various additives, for example, a flame retardant, a heat resistance improver, a water repellent, and the like, may be used to provide functionality to the noise-absorbent fabric. The additive is included in the first binder solution and no additional skin material for providing functionality to the noise-absorbent fabric is necessary.

The flame retardant suitably may be melamine, a phosphate, a metal hydroxide, and the like. For instance, one or more selected from melamine, melamine cyanurate, melamine polyphosphate, phosphazene, ammonium polyphosphate, and the like may be suitably used as the flame retardant. Preferably, the flame retardant may be melamine, which may substantially improve flame retardancy and heat resistance at the same time.

The heat resistance improver may be, but not limited to, alumina, silica, talc, clay, glass powder, glass fiber, metal powder, and the like.

Preferably, one or more fluorine-based water repellent may be used as the water repellent.

In addition, additives commonly used in the art may be selected and used depending on desired purposes.

In another aspect, the present invention provides a method for manufacturing a noise-absorbent fabric. The method may comprise: a) a step of immersing a nonwoven fabric comprising an amount of about 30-100 wt % of a heat-resistant fiber based on the total weight of the nonwoven fabric in a binder solution; b) a step of forming a noise-absorbing layer by drying the nonwoven fabric; and c) a step of manufacturing a noise-absorbent fabric by stacking a metal film on the noise-absorbing layer. The noise-absorbing layer 2 and the skin layer (metal film) 1 may have superior adhesion property due to the first binder contained in the noise-absorbing layer 2 and the second binder in the adhesive layer.

The method may further include d) a step of forming an adhesion layer 3 by coating an adhesive layer on a side of the metal film 1 facing to the noise-absorbing layer. The adhesion layer 3 may include highly heat-resistant second binder, which may be used to form the noise-absorbing layer 2, as the adhesive component as such, the adhesion property of bonding the metal film 1 and the noise-absorbing layer 2 may be substantially improved and the sound-absorbing property, heat-insulating property and sound-insulating property of the noise-absorbent fabric may be substantially improved. The second binder in the adhesive layer 3 may be the same or substantially same to the first binder impregnated in the nonwoven fabric in the noise-absorbing layer 2.

The adhesion layer 3 may include a silica aerosol in addition to the second binder used to form the noise-absorbing layer 2. When the silica aerosol is further contained in the adhesion layer 3, the sound-absorbing property, heat-insulating property and sound-insulating property of the noise-absorbent fabric may be substantially improved.

The adhesion layer 3 suitably may include the second binder and the silica aerogel at a weight ratio of about 1:0.1-2 based on solid content.

Preferably, the adhesion layer 3 may include a modified silica aerogel. For instance, the surface of the silica aerogel may be modified to attain hydrophilicity by a polyethylene glycol fatty acid ester. Since the increased hydrophilicity on the surface of the silica aerogel due to the attached or coated polyethylene glycol fatty acid ester, compatibility with the second binder contained as the adhesive component may be increased.

Preferably, the adhesion layer 3 may be stacked with a thickness of about 0.05-0.5 mm.

The method for manufacturing a noise-absorbent fabric according to the present invention are described in detail.

In the step a), a nonwoven fabric formed of a heat-resistant fiber may be immersed in a binder solution to impregnate the nonwoven fiber with the first binder. The nonwoven fabric may be immersed in the first binder solution so as to improve sound-absorbing and sound-insulating performance and to allow molding of the noise-absorbent fabric into a desired shape. The binder solution may include a first binder resin, a curing agent, a catalyst, a commonly used additive and a solvent.

The first binder, the curing agent, the catalyst and the commonly used additive contained in the binder solution may be the same as described above. The solvent used to prepare the binder solution may be one or more selected from the group consisting of a ketone, a carbonate, an acetate, a cellosolve, an alcohol, and the like. Preferably, the solvent may be one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve, ethanol, and isopropanol, but the examples of the solvent are limited thereto.

Preferably, the binder solution used in the present invention may include an amount of about 1-60 wt % of a first binder based on the total weight of the binder solution and a remaining balance of the solvent. The binder solution used in the present invention may further include a curing agent and other additives including a catalyst. For instance, the binder solution may include an amount of about 1-60 wt % of a first binder, an amount of about 0.1-10 wt % of a curing agent, an amount of about 0.01-5 wt % of a catalyst, an amount of about 1-40 wt % of an additive and the remaining balance of the solvent, all the wt % are based on the total weight of the binder solution. Particularly, the binder solution may include an amount of about 1-30 wt % of a first binder, an amount of about 0.1-10 wt % of a curing agent, an amount of about 0.01-5 wt % of a catalyst, an amount of about 1-30 wt % of a flame retardant as an additive and an amount of about 40-95 wt % of a solvent, all the wt % are based on the total weight of the binder solution.

The degree of impregnation into the nonwoven fabric may be controlled by controlling the concentration of the binder solution of the present invention. For instance, the binder solution may be prepared to have a solid content of about1-60 wt %, or particularly of about 20-50 wt %. When the binder solution has a solid content less than the predetermined range, for example, less than about 1 wt %, the purpose of the present invention may not be obtained because the content of the first binder impregnated into the nonwoven fabric is small. When the binder solution has a greater solid content than the predetermined range, for example, greater than about 60 wt %, the nonwoven fabric may become hard and may not serve as a noise-absorbent fabric.

When the content of the curing agent contained in the binder solution is less than the predetermined amount, for example, less than about 0.1 wt %, molding into a desired shape may be difficult because complete curing of the first binder cannot be expected and the effect of improving the mechanical strength of the noise-absorbent fabric may not be sufficient. When the content of the curing agent is greater than the predetermined amount, for example, greater than about 10 wt %, the noise-absorbent fabric may become hard and storage stability, or the like and may not be satisfactory. When the content of the catalyst is less than the predetermined amount, for example, less than about 0.01 wt %, the effect of facilitating reaction may not be sufficient. When the content of the catalyst is greater than the predetermined amount, for example, greater than about 5 wt %, storage stability, and the like may not be sufficient. The additive may be one or more additive(s) commonly used in the art, including a flame retardant, a heat resistance improver, a water repellent, the like. The content of these additives may be adjusted adequately depending on the purpose of addition. When the addition amount is less than the predetermined range of the additive, the desired effect may not be achieved. When the addition amount is greater than the range of the additive, economic efficiency may be reduced and side effects may be caused.

In the step b), a noise-absorbing layer may be formed by drying the nonwoven fabric. The drying in the present invention may be carried out by taking out the nonwoven fabric from the binder solution and removing the solvent. The drying may be carried out at appropriate temperatures and under pressure. Preferably, the drying may be performed at a temperature of about 70-200° C., or particularly at a temperature of about 100-150° C. During the drying process in the present invention, the content of the first binder in the nonwoven fabric may be controlled and thus, the physical properties of the noise-absorbent fabric may be controlled. The content of the first binder included in the nonwoven fabric after the drying may be an important factor determining the size, shape and distribution of microcavities inside the noise-absorbent fabric. Accordingly, the sound-absorbing property and mechanical property of the noise-absorbent fabric may be controlled. In the present invention, the drying may be carried out such that the final content of the first binder included in the nonwoven fabric may be about 1-300 parts by weight, or particularly about 30-150 parts by weight, based on 100 parts by weight of the nonwoven fabric.

In the step c), a noise-absorbent fabric may be prepared by stacking a skin layer of a metal film on the noise-absorbing layer. Preferably, the metal film used as the skin layer may have a thickness of about 0.01-0.5 mm. Although the material of the metal film is not particularly limited, one selected from aluminum, magnesium, stainless steel, steel and an alloy may be used but the examples of the metal film may not be limited thereto. To ensure stable stacking of the metal film, the second binder used to prepare the noise-absorbing layer may be coated on one side of the metal film facing to the noise-absorbing layer. The second binder, which preferably may be a thermosetting material, may be easily cured by heat during the stacking or molding at high temperature and may serve as an adhesive that tightly bind or join the noise-absorbing layer and the skin layer.

In the present invention, an adhesion layer 3 may be further formed by coating an adhesive component (e.g. adhesive solution) on one side of the metal film. The adhesive component in the adhesion layer 3 may include a second binder, which may be the same or substantially the same to the first binder used to form the noise-absorbing layer 2. For instance, the thermosetting resin impregnated in the nonwoven fabric may be used as the second binder or adhesive component in the adhesive layer 3. Because the thermosetting resin is easily cured through simple heat treatment while the noise-absorbing layer is stacked on the skin layer or while the manufactured noise-absorbed fabric is molded, the noise-absorbing layer and the skin layer may be tightly bonded or joined.

The adhesion layer 3 may include a silica aerosol in addition to the second binder component as used to form the noise-absorbing layer 2. When the silica aerosol is further contained in the adhesion layer 3, the sound-absorbing property, heat-insulating property and sound-insulating property of the noise-absorbent fabric may be further improved. Preferably, the silica aerosol having hydrophobic property may be modified to increase hydrophilicity on the surface using a polyethylene glycol fatty acid ester surfactant. The silica aerosol whose surface has been hydrophilically modified may induce uniform dispersion of the adhesion layer 3 due to substantially improved compatibility with the binder component. Preferably, the adhesion layer 3 may include the second binder and the silica aerogel at a weight ratio of about 1:0.1-2 based on solid content. When the amount of the second binder is less than the above-described range, the improvement in the sound-absorbing property, heat-insulating property and sound-insulating property of the noise-absorbent fabric by and the silica aerogel may not be sufficiently obtained. When the amount of the second binder is greater than the above-described range, the adhesion property of the adhesion layer 3 may not be sufficiently obtained.

Preferably, an adhesive solution comprising an amount of about 1-60 w % of a second binder based on the total weight of the adhesive solution and a remaining balance of a solvent may be used to form the adhesion layer 3. For instance, an adhesive solution comprising an amount of about 1-60 w % of a second binder, an amount of about 0.1-10 wt % of a silica aerogel powder and a remaining balance of a solvent, based on the total weight of the adhesive solution, may be may be used. Particularly, an adhesive solution may comprise an amount of about 1-30 w % of a second binder, an amount of about 0.5-5 wt % of a silica aerogel powder, an amount of about 0.1-5 wt % of a polyethylene glycol fatty acid ester as a surface modifier and a solvent as a balance, based on the total weight of the adhesive solution.

The solvent used to prepare the adhesive solution may be one or more selected from a ketone, a carbonate, an acetate, a cellosolve, an alcohol, etc. Preferably, the solvent may be one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve, ethanol, isopropanol, and the like.

Additionally, other additives including the curing agent and the catalyst used to prepare the binder solution may be further contained in the adhesive solution.

The adhesive solution suitably may be coated such that the thickness of the adhesion layer 3 after drying may range from about 0.05 to about 0.5 mm.

The method for manufacturing a noise-absorbent fabric according to the present invention may further include, after the step c), d) a step of molding the noise-absorbent fabric at high temperature. For example, the method for manufacturing a noise-absorbent fabric including the step d) may include: a) a step of immersing a nonwoven fabric containing 30-100 wt % of a heat-resistant fiber in a binder solution; b) a step of forming a noise-absorbing layer by drying the nonwoven fabric; c) a step of manufacturing a noise-absorbent fabric by stacking a metal film on the noise-absorbing layer; and d) a step of molding the noise-absorbent fabric at high temperature.

In the step d), the thus formed noise-absorbent fabric in the step c) may be molded into a desired shape at high temperature. The molding at high temperature may include curing of the thermosetting first binder or the second binder and may be carried out at a temperature of about 150-300° C., or particularly of about at a temperature of about 170-230° C.

Moreover, the method for manufacturing a noise-absorbent fabric according to the present invention may further include, before the step a), a-1) a step of forming a nonwoven fabric by a needle punching process using a heat-resistant fiber. For example, in the step a-1), an aramid nonwoven fabric having a thickness of about 3-20 mm may be formed by a needle punching process of a heat-resistant aramid fiber having a fineness of about 1-15 denier. For example, the method for manufacturing a noise-absorbent fabric according to the present invention including the step a-1) may include: a-1) a step of forming an aramid nonwoven fabric having a thickness of about 3-20 mm by a needle punching process of a heat-resistant aramid fiber having a fineness of about 1-15 denier; a) a step of immersing the aramid nonwoven fabric comprising an amount of about 30-100 wt % of the heat-resistant fiber based on the total weight of the aramid nonwoven fabric in a binder solution; b) a step of forming a noise-absorbing layer by drying the nonwoven fabric; and c) a step of manufacturing a noise-absorbent fabric by stacking a metal film on the noise-absorbing layer. In addition, the method for manufacturing a noise-absorbent fabric according to the present invention including the step a-1) may also include: a-1) a step of forming an aramid nonwoven fabric having a thickness of about 3-20 mm by a needle punching process of a heat-resistant aramid fiber having a fineness of about 1-15 denier; a) a step of immersing the nonwoven fabric comprising an amount of about 30-100 wt % of the heat-resistant fiber based on the total weight of the aramid nonwoven fabric in a binder solution; b) a step of forming a noise-absorbing layer by drying the nonwoven fabric; c) a step of manufacturing a noise-absorbent fabric by stacking a metal film on the noise-absorbing layer; and d) a step of molding the noise-absorbent fabric.

The step a-1) of forming the nonwoven fabric may include a needle punching process using a heat-resistant fiber. The sound-absorbing property may vary depending on the thickness and density of the nonwoven fabric. It is expected that the sound-absorbing property may be improve as the thickness and density of the nonwoven fabric are increased.

The nonwoven fabric used in the present invention suitably may have a thickness of about 3-20 mm when considering the industrial field, and the like where the noise-absorbent fabric is used. When the thickness of the nonwoven fabric is less than 3 mm, the durability and moldability of the noise-absorbent fabric may not be sufficient. When the thickness is greater than about 20 mm, productivity may decrease and production cost may increase. Preferably, the density of the nonwoven fabric may be about 100-2000 g/m$^2$, about 200-1200 g/m$^2$, or particularly of about 300-800 g/m$^2$, when considering performance and cost.

The aramid nonwoven fabric may be formed by stacking two to twelve layers of a web of about 30-100 g/m$^2$ formed, for example, by carding and continuously performing up-down preneedling, down-up needling and up-down needling, thereby forming physical bridges that provide the necessary thickness, binding strength and other desired physical properties. The needle used to perform the needling may be a barb-type needle, having a working blade of about 0.5-3 mm and a needle length (the distance from crank outside to point) of about 70-120 mm. Preferably, the needle stroke may be about 30-350 times/m$^2$.

Preferably, the fineness of yarn for the nonwoven fabric may be about 1.5-8.0 denier, the thickness of the pile layer may be about 6-13 mm, the needle stroke may be about 120-250 times/m$^2$, and the density of the nonwoven fabric may be about 300-800 g/m$^2$.

The internal structure of the noise-absorbent fabric manufactured by the method described above may be confirmed using an electron microscope. When observed with an electron microscope, the noise-absorbent fabric of the present invention may have 1-100 μm-sized microcavities distributed inside thereof. The microcavities may be distributed regularly or irregularly with a spacing of about 0.1-500 μm.

In another aspect, the present invention provides a method for reducing noise of a noise-generating device, including: i) checking the three-dimensional shape of a noise-generating device; ii) manufacturing and molding a noise-absorbent fabric so as to partially or entirely correspond to the three-dimensional shape of the device; and iii) applying the noise-absorbent fabric adjacent to the noise-generating device.

The noise-generating device includes a motor, an engine, an exhaust system, and the like. However, the scope of the device is never limited to the motor, engine or exhaust system. The noise-absorbent fabric may be manufactured to correspond to the three-dimensional shape of the device partially or wholly. Since the noise-absorbent fabric of the present invention is moldable during curing of the first binder, the noise-absorbent fabric may be molded to partially or entirely correspond to the three-dimensional shape of the device.

The expression "adjacent" means closely attaching the noise-absorbent fabric to the noise-generating device, providing the noise-absorbent fabric at a predetermined distance from the noise-generating device, or molding it as a part of the noise-generating device. The expression adjacent also includes mounting the noise-absorbent fabric to a member connected to the noise-generating device (e.g., another noise-absorbent fabric).

FIGS. 3A-3B and FIGS. 4A-4B show representative examples wherein the noise-absorbent fabric of the present invention is applied to a noise-generating device of a vehicle.

Figure 3A:
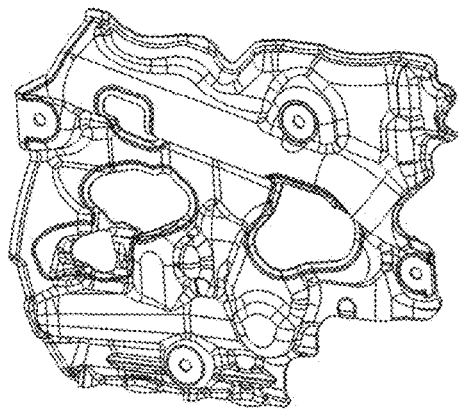
FIGS. 3A-3B show an exemplary noise-absorbent fabric applied to a noise-generating device of a vehicle after molding as a part.
Figure 3B:
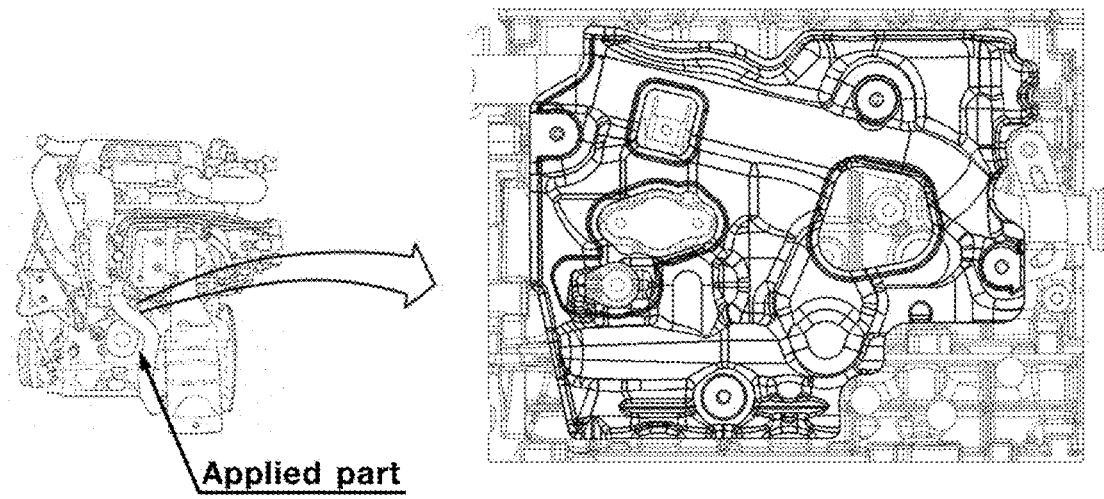

FIGS. 3A-3B show an example wherein an exemplary noise-absorbent fabric is molded as a part and applied to an exemplary noise-generating device of a vehicle. FIG. 3A is an image of an exemplary noise-absorbent fabric molded to be used in an automobile engine, and FIG. 3B shows an exemplary noise-absorbent fabric is applied in a part of a vehicle engine.

Figure 4A:
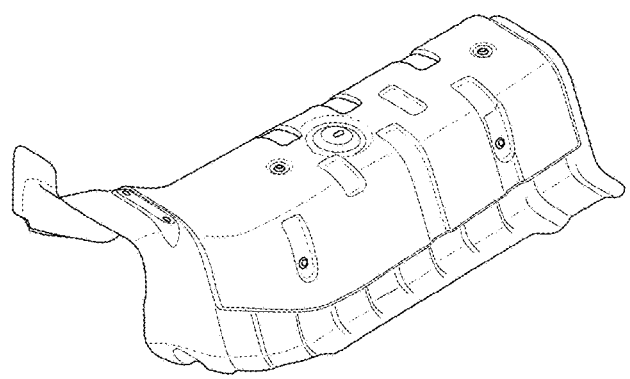
FIGS. 4A-4B shows an exemplary noise-absorbent fabric being applied to an exemplary noise-generating device of an exemplary vehicle at a predetermined distance.
Figure 4B:
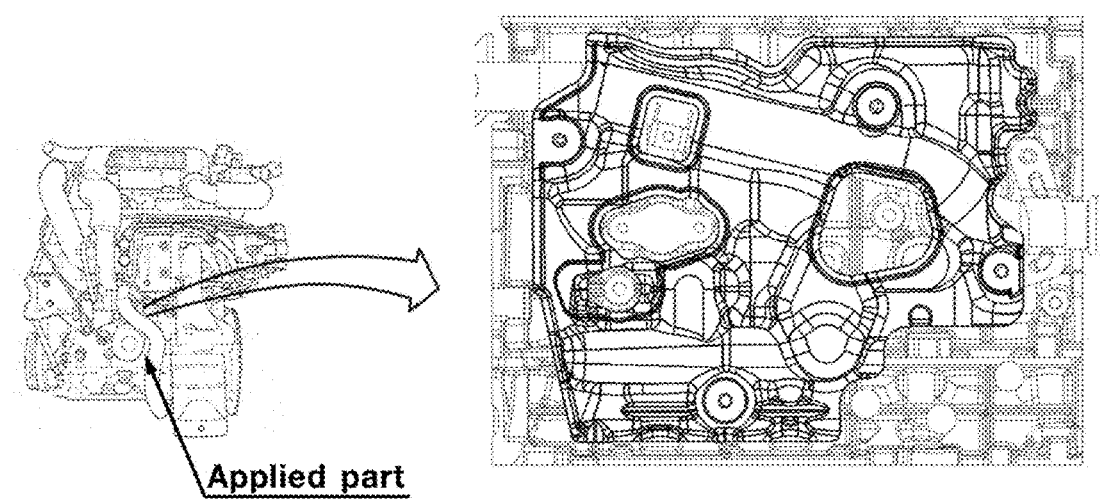

FIGS. 4A-4B show an exemplary noise-absorbent fabric is applied to an exemplary noise-generating device of a vehicle. FIG. 4A is an image of an exemplary noise-absorbent fabric molded to be used in a lower part of a vehicle, and FIG. 4B shows an exemplary noise-absorbent fabric is attached to a lower part of a vehicle.

As described above, the noise-absorbent fabric of the present invention, which comprise the first binder impregnated to maintain the three-dimensional structure inside the nonwoven fabric, may obtain an improved sound-absorbing property, flame retardancy, a heat-insulating property and heat resistance and may have the desired sound-absorbing performance without deformation when directly applied to a noise-generating device operating and maintained at high temperatures of about 300° C. or above.

EXAMPLES

The present invention will be described in more detail through examples. The following examples are for illustrative purposes only and it will be apparent to those skilled in the art that the scope of this invention is not limited by the examples.

[Examples] Manufacturing of Noise-Absorbent Fabric

Example 1. Manufacturing of Noise-Absorbent Fabric Wherein Noise-Absorbing Layer and Aluminum Thin Film are Stacked A meta-aramid short fiber having a limiting oxygen index (LOI) of 40%, a heat resistance temperature of 310° C., a fineness of 2 denier and a length of 51 mm was air blown and formed into a web of 30 g/m$^2$ through carding. The web was stacked by overlapping 10 layers on a conveyor belt operated at 5 m/min using a horizontal wrapper. An aramid nonwoven fabric having a density of 300 g/m$^2$ and a thickness of 6 mm was prepared by continuously performing up-down needling, down-up needling and up-down needling with a needle stroke of 150 times/m$^2$.

A noise-absorbing layer 2 was formed by immersing the prepared nonwoven fabric in a binder solution with 1 dip 1 nip (pick-up 300%) and then drying the same. The binder solution contained 8 wt % of bisphenol A diglycidyl ether, 2 wt % of a bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the binder solution. The nonwoven fabric was taken out from the binder solution and dried at a temperature of 150° C. The dried nonwoven fabric contained 50 parts by weight of a first binder based on 100 parts by weight of the nonwoven fabric.

1 g of an adhesive solution was coated on one side facing toward the noise-absorbing layer 2 of an aluminum thin film having a thickness of 0.1 mm. The adhesive solution contained 8 wt % of bisphenol A diglycidyl ether, 2 wt % of a bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the adhesive solution. Actually, the binder solution used to immerse the nonwoven fabric was used as the adhesive solution.

After forming a skin layer 1 by stacking the aluminum thin film such that the binder solution-coated side contacted the upper side of the noise-absorbing layer 2, a noise-absorbent fabric was molded into a desired shape by curing at a temperature of 200° C. for 2 minutes.

Example 2. Manufacturing of Noise-Absorbent Fabric Wherein Noise-Absorbing Layer, Aluminum Thin Film and Adhesion Layer are Stacked A skin layer 1 was formed by stacking an aluminum thin film on the upper side of a noise-absorbing layer 2 prepared in the same manner as in Example 1. However, after coating an adhesive solution on one side facing toward the noise-absorbing layer 2 of an aluminum thin film having a thickness of 0.1 mm to a thickness of 0.5 mm, the aluminum thin film was stacked such that the adhesive solution-coated side contacted the upper side of the noise-absorbing layer 2. The adhesive solution was prepared by mixing 8 wt % of bisphenol A diglycidyl ether, 2 wt % of a bisphenol A diglycidyl ether polymer, 0.2 wt % of dicyandiamide, 0.02 wt % of dimethylurea, 9 wt % of melamine cyanurate, 2 wt % of polyethylene glycol hexadecyl ester, 16 wt % of isopropyl alcohol and 60.78 wt % of dimethyl carbonate and then adding 2 wt % of a silica aerogel, based on the total weight of the adhesive solution.

Then, a noise-absorbent fabric in which the skin layer 1, the noise-absorbing layer 2 and an adhesion layer 3 joining the skin layer and the noise-absorbing layer were stacked was molded into a desired shape by curing at a temperature of 200° C. for 2 minutes.

Comparative Example 1. Manufacturing of Noise-Absorbent Fabric Formed of Aramid Nonwoven Fabric An aramid nonwoven fabric having a density of 300 g/m$^2$ and a thickness of 6 mm was prepared by needle punching as described in Example 1.

Comparative Example 2. Manufacturing of Noise-Absorbent Fabric Formed of Epoxy Resin-Impregnated Aramid Nonwoven Fabric A noise-absorbing layer 2 prepared by impregnating an epoxy binder solution into an aramid nonwoven fabric and then drying in the same manner as described in Example 1 was used as a noise-absorbent fabric.

Comparative Example 3. Manufacturing of Noise-Absorbent Fabric Wherein Noise-Absorbing Layer, Aluminum Thin Film and Adhesion Layer are Stacked A noise-absorbing layer 2 was prepared by impregnating an epoxy binder solution into an aramid nonwoven fabric and then drying in the same manner as described in Example 1. Then, a skin layer 1 was formed on the prepared noise-absorbing layer 2 by stacking an aluminum thin film. After coating an adhesive layer with a thickness of 0.5 mm on one side facing toward the noise-absorbing layer 2 of an aluminum thin film having a thickness of 0.1 mm, the aluminum thin film was stacked such that it contacted the upper side of the noise-absorbing layer 2 where the adhesive solution was coated. Polychloroprene resin was used as the adhesive.

The noise-absorbent fabric wherein the skin layer 1, the noise-absorbing layer 2 and an adhesion layer 3 joining the skin layer and the noise-absorbing layer were stacked was molded into a desired shape by curing at a temperature of 200° C. for 2 minutes.

Comparative Example 4. Manufacturing of Noise-Absorbent Fabric Formed of Aluminum Thin Film An aluminum thin film having a thickness of 0.1 mm was used as a noise-absorbent fabric.

Test Examples

<Evaluation of Physical Properties of Noise-Absorbent Fabrics>

The physical properties of the noise-absorbent fabrics of Examples 1-2 and Comparative Examples 1-4 were measured as follows.

Test Example 1. Comparison of Adhesion Property

In Test Example 1, the adhesion property of the noise-absorbent fabrics manufactured in Examples 1-2 and Comparative Example 3 between the aluminum thin film and noise-absorbing layer was compared. The result is summarized in Table 1.

TABLE 1

|  |  | Example 1 | Example 2 | Comparative Example 3 |
|---|---|---|---|---|
| Noise-absorbent fabric | Skin layer 1 | Aluminum thin film | Aluminum thin film | Aluminum thin film |
|  | Noise-absorbing layer 2 | Impregnated nonwoven fabric | Impregnated nonwoven fabric | Impregnated nonwoven fabric |
|  | Adhesion layer 3 | Epoxy resin | Epoxy resin + silica aerogel | Common adhesive |
| Adhesion strength (N/m) |  | 100 | 150 | 40 |
| Post-heating adhesion strength |  | 80 | 135 | Peeling observed |
| Adhesion strength after thermal cycle |  | 82 | 135 | Peeling observed |

(1) Evaluation of Adhesion Strength

The adhesion strength between the skin layer 1 of an aluminum thin film and the noise-absorbing layer 2 was measured by the following method. A test specimen with a width of 30 mm and a length of 150 mm was prepared. Then, the aluminum thin film was forcibly peeled from the noise-absorbing layer by 50 mm. Each of the peeled aluminum thin film and noise-absorbing layer was fixed by a clamp of a tensile testing machine and the mean of maximum load when the peeling was performed at a speed of 200 mm/min was measured.

(2) Evaluation of Post-Heating Adhesion Strength

The noise-absorbent fabric was aged in an oven at a temperature of 260° C. for 300 hours. After keeping at standard state (temperature 23±2° C., 50±5% relative humidity) for at least 1 hour, the adhesion strength of the heated noise-absorbent fabric was measured.

From Table 1, it can be seen that the noise-absorbent fabrics of Examples 1-2 according to the present invention maintained tight joining between the skin layer 1 and the noise-absorbing layer 2 after heating or thermal cycle. In contrast, the noise-absorbent fabric of Comparative Example 3 wherein the skin layer 1 and the noise-absorbing layer 2 were joined using a common adhesive showed poor adhesion property. In particular, peeling occurred between the two layers after heating or thermal cycle.

Test Example 2. Comparison of Sound-Insulating Property

In Test Example 2, the sound-insulating property of the noise-absorbent fabrics manufactured in Examples 1-2, Comparative Example and Comparative Example 4 was compared. The result is summarized in Table 2.

TABLE 2

|  |  | Example 1 | Example 2 | Comparative Example 2 | Comparative Example 4 |
|---|---|---|---|---|---|
| Noise-absorbent fabric | Skin layer 1 | Aluminum thin film | Aluminum thin film | — | Aluminum thin film |
|  | Noise-absorbing layer 2 | Impregnated nonwoven fabric | Impregnated nonwoven fabric | Impregnated nonwoven fabric | — |
|  | Adhesion layer 3 | Epoxy resin | Epoxy resin + silica aerogel | — | — |
| Sound-insulating property (dB) | 1000 Hz | 15 | 15 | 4 | 1 |
|  | 2000 Hz | 18 | 17 | 4 | 1 |
|  | 3150 Hz | 20 | 20 | 5 | 1 |
|  | 5000 Hz | 25 | 25 | 6 | 1 |

(3) Evaluation of Adhesion Strength after Thermal Cycle

The adhesion strength of the noise-absorbent fabric was evaluated by the thermal cycle test method. The adhesion strength was measured after one cycle of room temperature-→high temperature (150° C.×3 hr)→room temperature-→low temperature (−30° C.×3 hr)→room temperature→humid condition (50° C.×95% RH).

(4) Evaluation of Sound-Insulating Property

The sound-insulating property of the noise-absorbent fabric was measured by a standard method of ISO 15186-1.

Figure 5:
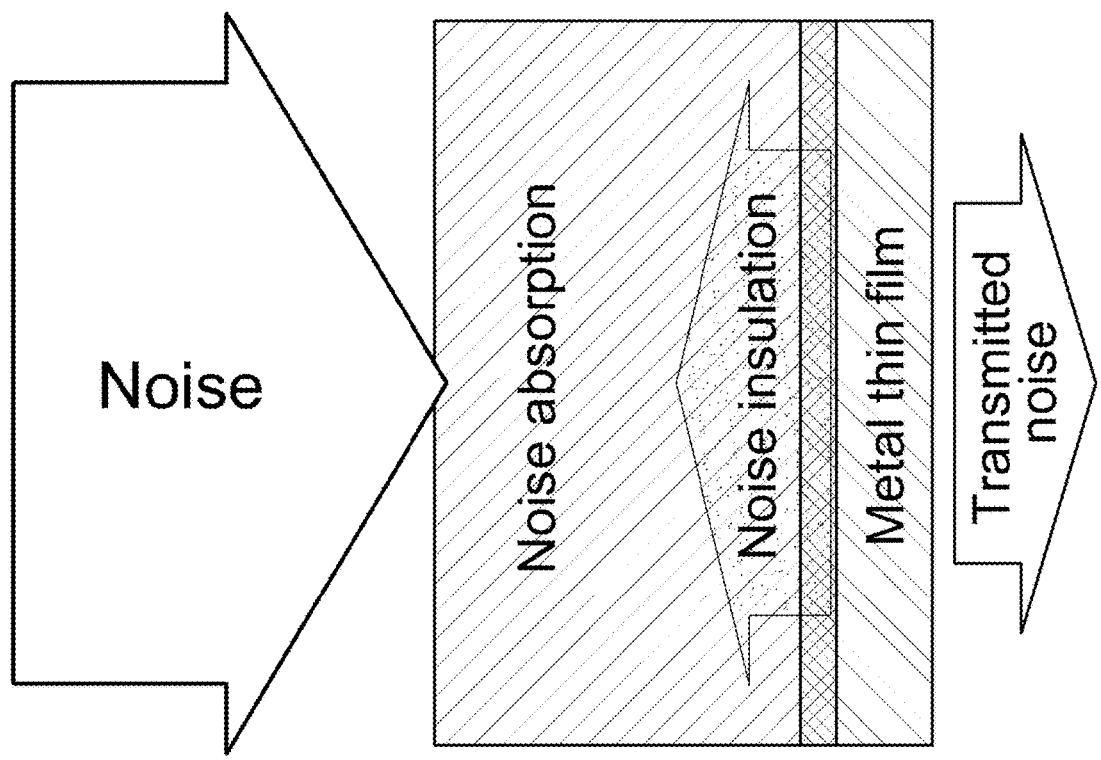
FIG. 5 depicts an exemplary noise-blocking mechanism of an exemplary noise-absorbent fabric according to an exemplary embodiment of the present invention.

From Table 2, it can be seen that the noise-absorbent fabrics of Examples 1-2 exhibited superior sound-insulating property. In particular, the noise-absorbent fabric of Example 2, wherein a silica aerogel was further contained in the adhesion layer, exhibited remarkably improved sound-insulating property. In addition, as seen from FIG. 5, the noise-absorbent fabric according to the present invention exhibited remarkably improved sound-insulating property because noise was partly absorbed by the noise-absorbing layer 2 and the noise that passed through the noise-absorbing layer 2 is reflected by the skin layer of an aluminum thin film and then absorbed by the noise-absorbing layer 2. Moreover, the noise-absorbent fabric wherein the silica aerogel was further contained in the adhesion layer, the sound-insulating property was further increased by the silica aerogel.

In contrast, the noise-absorbent fabric formed only of the noise-absorbing layer 2 or the aluminum thin film 1 had weaker sound-insulating property than those of Examples 1-2.

Test Example 3. Comparison of Heat-Insulating Property

In Test Example 3, the heat-insulating properties of the noise-absorbent fabrics manufactured in Examples 1-2 and Comparative Examples 2-4 were compared.

In order to evaluate the heat-insulating property, heat at a temperature of 1000° C. was applied to one side of a 25-mm thick specimen of each noise-absorbent fabric for 5 minutes and temperature was measured on the opposite side of the specimen. The result is summarized in Table 3.

TABLE 3

| | | Example 1 | Example 2 | Comparative Example 2 | Comparative Example 3 | Comparative Example 4 |
|---|---|---|---|---|---|---|
| Noise-absorbent fabric | Skin layer 1 | Aluminum thin film | Aluminum thin film | — | Aluminum thin film | Aluminum thin film |
| | Noise-absorbing layer 2 | Impregnated nonwoven fabric | Impregnated nonwoven fabric | Impregnated nonwoven fabric | Impregnated nonwoven fabric | — |
| | Adhesion layer 3 | Epoxy resin | Epoxy resin + silica aerogel | — | Common adhesive | — |
| Temperature o opposite side (° C.) | | 170 | 150 | 250 | Degradation/peeling | 350 |

From Table 3, it can be seen that the noise-absorbent fabrics of Examples 1-2 according to the present invention exhibited remarkably better heat-insulating property as compared to those of the comparative examples. The noise-absorbent fabric of Comparative Example 3, wherein the skin layer and the noise-absorbing layer were joined by a common adhesive, was peeled as the adhesion layer was degraded as soon as the heat of 1000° C. was applied. Accordingly, it can be seen that the effect desired by the present invention obtained, when the adhesive material used to join the skin layer and the noise-absorbing layer has good heat resistance.

Figure 6:
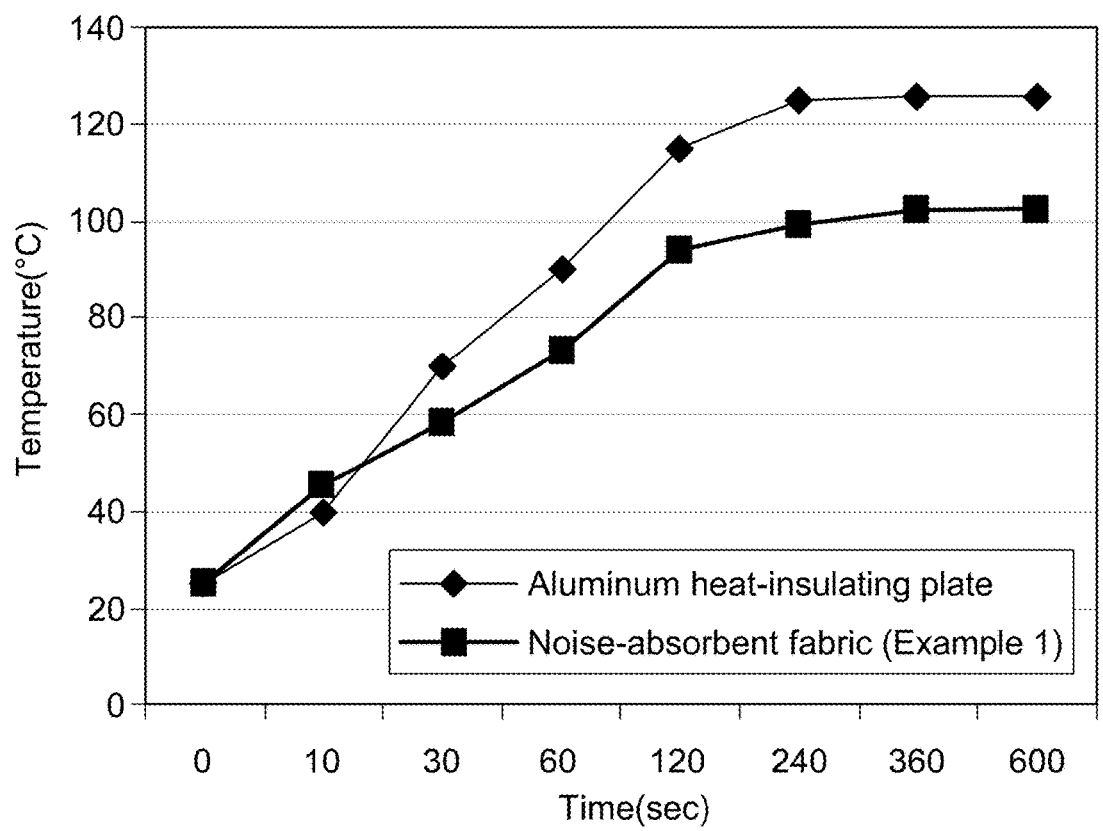
FIG. 6 is a graph comparing a heat-insulating performance of an aluminum heat-insulating plate (Comparative Example 4) with that of an exemplary noise-absorbent fabric according to an exemplary embodiment of the present invention (Example 1).

FIG. 6 is a graph comparing the heat-insulating property of an aluminum heat-insulating plate (Comparative Example 4) with that of the noise-absorbent fabric of the present invention (Example 1). While applying heat at a temperature of 1000° C. continuously for 10 minutes, the temperature at the opposite side was measured with time. It can be seen that the noise-absorbent fabric of the present invention (Example 1) showed gradually increasing heat-insulating property with time as compared to the aluminum heat-insulating plate (Comparative Example 4).

Test Example 4. Comparison of Moldability of Noise-Absorbent Fabric

In Test Example 4, the appearances of the noise-absorbent fabrics manufactured in Examples 1-2 and Comparative Example 3 were compared after molding.

The noise-absorbent fabrics of Examples 1-2 showed no deformation after molding because the aluminum thin film 1 and the noise-absorbing layer were firmly joined. In contrast, the noise-absorbent fabric of Comparative Example 3 was easily deformed when a pressure of 1 kgf was applied.

What is claimed is:

1. A noise-absorbent fabric comprising:
    a metal film; and
    a noise-absorbing layer comprising a nonwoven fabric comprising i) an amount of about 30-100 wt % of a heat-resistant fiber based on the total weight of the noise-absorbing layer and ii) a first binder,
    wherein the nonwoven fabric comprises microcavities.

2. The noise-absorbent fabric according to claim 1, the first binder is present in the same layer as the nonwoven fabric and maintains a three-dimensional structure inside the nonwoven fabric, and the first binder maintains and/or forms the microcavities in the nonwoven fabric as being distributed and attached on a yarn surface of the nonwoven fabric.

3. The noise-absorbent fabric according to claim 1, further comprising an adhesion layer which is positioned between the metal film and the noise-absorbing layer and adheres the metal film to the noise-absorbing layer, wherein the adhesion layer comprises a second binder, wherein the second binder has the same components as the first binder.

4. The noise-absorbent fabric according to claim 3, wherein the adhesion layer comprises the second binder in the noise-absorbing layer and a silica aerogel.

5. The noise-absorbent fabric according to claim 4, wherein the adhesion layer comprises the second binder and the silica aerogel at a weight ratio of about 1:0.1-2 based on solid content.

6. The noise-absorbent fabric according to claim 4, wherein a surface of the silica aerogel is modified with a polyethylene glycol fatty acid ester.

7. The noise-absorbent fabric according to claim 1, wherein the metal film is an aluminum thin film having a thickness of about 0.01-0.5 mm.

8. The noise-absorbent fabric according to claim 1, wherein the heat-resistant fiber has a limiting oxygen index (LOI) of 25% or greater and a heat resistance temperature of about 300° C. or greater.

9. The noise-absorbent fabric according to claim 1, wherein the heat-resistant fiber is one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

10. The noise-absorbent fabric according to claim 1, wherein the heat-resistant fiber is an aramid fiber.

11. The noise-absorbent fabric according to claim 1, wherein the nonwoven fabric is formed in a single-layer comprising an aramid fiber having a fineness of about 1-15 denier and having a thickness of about 3-20 mm.

12. The noise-absorbent fabric according to claim 1, wherein the nonwoven fabric has a density of about 100-2000 g/m².

13. The noise-absorbent fabric according to claim 1, wherein the first binder is a thermosetting resin.

14. The noise-absorbent fabric according to claim 1, wherein the first binder is an epoxy resin.

15. The noise-absorbent fabric according to claim 14, wherein the epoxy resin is one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin, and an o-cresol novolac epoxy resin.

16. A method for manufacturing the noise-absorbent fabric according to claim 1, comprising:
   immersing a nonwoven fabric comprising an amount of about 30-100 wt % of a heat-resistant fiber based on the total weight of the nonwoven fabric in a binder solution comprising the first binder;
   forming a noise-absorbing layer by drying the nonwoven fabric; and
   manufacturing a noise-absorbent fabric by stacking a metal film on the noise-absorbing layer.

17. The method according to claim 16, further comprising coating an adhesive layer comprising a second binder on a side of the metal film facing to the noise-absorbing layer, wherein the second binder has the same components as the first binder.

18. The method according to claim 17, wherein the adhesion layer comprises the second binder used in the noise-absorbing layer and a silica aerogel.

19. The method according to claim 18, wherein the adhesion layer comprises the second binder and the silica aerogel at a weight ratio of about 1:0.1-2 based on solid content.

20. The method according to claim 18, wherein a surface of the silica aerogel is modified using a polyethylene glycol fatty acid ester.

21. A method for reducing noise of a noise-generating device, comprising:
   i) manufacturing and molding a noise-absorbent fabric according to claim 1 so as to correspond partially or entirely to the three-dimensional shape of a noise-generating device; and
   ii) applying the noise-absorbent fabric adjacent to the noise-generating device.

22. The method according to claim 21, wherein the device is a motor, an engine or an exhaust system.

23. The method according to claim 21, wherein the noise-absorbent fabric is applied adjacent to the noise-generating device by attaching the noise-absorbent fabric to the noise-generating device, providing the noise-absorbent fabric at a predetermined distance from the noise-generating device, or molding the noise-absorbent fabric as a part of the noise-generating device.

24. A vehicle comprising a noise-absorbent fabric of claim 1.

* * * * *